(12) United States Patent
Setlak

(10) Patent No.: US 6,795,569 B1
(45) Date of Patent: Sep. 21, 2004

(54) FINGERPRINT IMAGE COMPOSITING METHOD AND ASSOCIATED APPARATUS

(75) Inventor: Dale R. Setlak, Melbourne, FL (US)

(73) Assignee: Authentec, Inc., Melbourne, FL (US)

( * ) Notice: Subject to any disclaimer, the term of this patent is extended or adjusted under 35 U.S.C. 154(b) by 0 days.

(21) Appl. No.: 09/567,645

(22) Filed: May 9, 2000

Related U.S. Application Data
(60) Provisional application No. 60/133,414, filed on May 11, 1999.

(51) Int. Cl.[7] .................................. G06K 9/00
(52) U.S. Cl. ........................ 382/124; 382/125
(58) Field of Search ................. 382/115, 124, 382/125; 283/68; 235/380, 492; 704/246, 273; 902/3, 4, 25; 340/5.52, 5.53, 5.82, 5.83; 356/71

(56) References Cited

U.S. PATENT DOCUMENTS

| | | | | |
|---|---|---|---|---|
| 5,982,914 A | * | 11/1999 | Lee et al. | 382/124 |
| 6,317,508 B1 | * | 11/2001 | Kramer et al. | 382/124 |
| 6,333,989 B1 | * | 12/2001 | Borza | 382/124 |
| 6,459,804 B2 | | 10/2002 | Mainguet | 382/124 |
| 6,546,122 B1 | * | 4/2003 | Russo | 382/125 |

FOREIGN PATENT DOCUMENTS

| | | |
|---|---|---|
| EP | 0 778 541 | 6/1997 |
| WO | 98/46114 | 10/1998 |
| WO | 99/06942 | 2/1999 |

* cited by examiner

*Primary Examiner*—Samir Ahmed
(74) *Attorney, Agent, or Firm*—Allen, Dyer, Doppelt Milbrath & Gilchrist, P.A.

(57) ABSTRACT

A method and apparatus generates fingerprint data for a fingerprint area larger than a sensing area of a fingerprint sensor. A fingerprint of a user is enrolled by generating fingerprint data sets responsive to placing a finger of a user on a sensing area of the fingerprint sensor a plurality of times with the finger being slightly repositioned on successive placements. The method also includes processing the fingerprint data sets to generate a composite fingerprint data set over an area of the fingerprint larger than the sensing area of the fingerprint sensor. The method may also be extended to the matching of a new fingerprint to an enrolled fingerprint based upon at least one sensing of the new fingerprint and the composite fingerprint data sets. A plurality of fingerprint feature location data sets may be generated and include at least one of a plurality of minutiae location data sets, a plurality of skin pore location data sets, and a plurality of feature location data sets relating to fingerprint ridge flows.

12 Claims, 6 Drawing Sheets

FINGERPRINT IMAGE COMPOSITING METHOD AND ASSOCIATED APPARATUS

RELATED APPLICATION

This application is based upon prior filed copending provisional application Serial No. 60/133,414 filed May 11, 1999.

FIELD OF THE INVENTION

The invention relates to the field of fingerprint processing, and, more particularly, to the field of storing a database of fingerprint data and matching a new fingerprint to the database.

BACKGROUND OF THE INVENTION

Fingerprint matching is a reliable and widely used technique for personal identification or verification. In particular, a common approach to fingerprint identification involves scanning a sample fingerprint or an image thereof, converting it into electrical signals, and storing the image and/or unique characteristics of the fingerprint image. The characteristics of a sample or new fingerprint may be compared to information for reference fingerprints already in storage to determine or verify a person's identity.

Unfortunately, comparing a sample fingerprint to a large number of reference fingerprints may be prohibitively expensive and/or simply take too long. Accordingly, fingerprints are typically classified into a plurality of discrete sets and/or subsets in the form of a hierarchical tree to thereby expedite searching. For example, a common top level classification for fingerprints usually differentiates the prints into the classes of: plain whorl, plain loop, tented arch, etc. based upon broad ridge pattern types. These classes may be yet further divided into subclasses. Accordingly, a fingerprint sample to be searched, once itself classified, can be more efficiently compared to only those prints in the respective classes and subclasses of the search tree. For example, U.S. Pat. No. 5,465,303 to Levison et al. describes both the widely used Henry classification system and the Vucetich classification system.

When the quality of the original copy of a fingerprint is bad, the print may contain many local distortions of the ridge pattern which may result in incorrect orientation of the fingerprint. U.S. Pat. No. 5,140,642 to Hsu et al. is directed to a method for determining the actual position of a core point of a fingerprint based upon finding ridge flows and assigning a direction code, correcting the ridge flows, and allocating the core point based upon the corrected direction codes. Along these lines, U.S. Pat. No. 5,040,224 to Hara discloses an approach to preprocessing fingerprints to correctly determine a position of the core of each fingerprint image for later matching by minutiae patterns.

Fingerprint minutiae, the branches or bifurcations and end points of the fingerprint ridges, are often used to determine a match between a sample print and a reference print database. For example, U.S. Pat. Nos. 3,859,633 and 3,893,080 both to Ho et al. are directed to fingerprint identification based upon fingerprint minutiae matching.

U.S. Pat. No. 4,151,512 to Riganati et al. describes a fingerprint classification method using extracted ridge contour data. The ridge flow in the fingerprint pattern and minutiae data are identified and extracted from a fingerprint pattern. Topological data, identifying singularity points such as tri-radii and cores, as well as ridge flow line tracings related to those points are extracted from the ridge contour data. The extracted information is used to automatically perform classification of the fingerprint patterns and/or matching of the fingerprint pattern with patterns stored in a mass file.

U.S. Pat. No. 5,845,005 to Setlak et al., and assigned to the assignee of the present invention, discloses a significant advance in the area of fingerprint indexing and searching of a database of reference fingerprints to determine a match. In particular, index values are calculated which are generally evenly distributed and continuous over a relatively large population of individuals. The index values may be determined based upon ridge flow curvature of the fingerprints. A particularly advantageous index, called a curliness index, is disclosed and this index is based upon an aggregate of a magnitude of a rate of change of ridge direction vectors.

Other important advances have also been made in the area of integrated circuit fingerprint sensors, as disclosed, for example, in U.S. Pat. Nos. 5,828,773 and 5,862,248, both assigned to the assignee of the present invention. The disclosed sensors are based upon generating an electric field which can sense the ridges of a fingerprint despite contamination, skin surface damage, and other factors. The sensor is relatively compact and rugged.

Despite improvements in sensor technology and in fingerprint enrollment and matching approaches, processing is still computationally intensive thus limiting widespread use of fingerprint sensing. In addition, sensing typically requires a relatively large sensor area to ensure accurate results. The sensor size has an important bearing on the sensor cost, especially for the new class of integrated circuit fingerprint sensors.

SUMMARY OF THE INVENTION

In view of the foregoing background, it is therefore an object of the invention to provide a method and fingerprint sensor apparatus for enrolling and/or matching a fingerprint, and to reduce computations and/or permit the sensing surface to be relatively small.

This and other objects, features and advantages in accordance with the present invention are provided in one embodiment by a method for generating fingerprint data for a fingerprint area larger than a sensing area of a fingerprint sensor. The method preferably comprises enrolling a fingerprint of a user by generating a plurality of fingerprint data sets responsive to placing a finger of a user on a sensing area of the fingerprint sensor a plurality of times with the finger being slightly repositioned on successive placements. The method also preferably includes processing the plurality of fingerprint data sets to generate a composite fingerprint data set over an area of the fingerprint larger than the sensing area of the fingerprint sensor. Of course, the method may also be extended to the matching of a new fingerprint to an enrolled fingerprint based upon at least one sensing of the new fingerprint and the composite fingerprint data set.

The step of matching may include comparing a predetermined number of sensings of the new fingerprint with the composite fingerprint data set to achieve a desired performance, such as a desired false reject rate, and/or a desired false acceptance rate. The step of generating a plurality of data sets preferably comprises generating a plurality of fingerprint feature location data sets. The feature location data sets may comprise at least one of a plurality of minutiae location data sets, a plurality of skin pore location data sets, and a plurality of feature location data sets relating to fingerprint ridge flows.

The step of processing may comprise determining a core location for each data set. In addition, the step of processing may comprise accounting for distortion of the finger surface in the plurality of data sets. For example, the step of accounting for distortion preferably comprises calculating centroids of fingerprint feature locations relative to a reference frame or location, such as the fingerprint core position.

The step of generating the plurality of fingerprint data sets may preferably comprise generating a predetermined number of fingerprint data sets based upon the predetermined number of finger placements within a predetermined time. For example, the predetermined number may be in a range of about 2 to 5.

Another aspect of the invention relates to the fingerprint sensor apparatus. The fingerprint sensor apparatus preferably includes a fingerprint sensing area, and an enrollment circuit for enrolling a fingerprint of a user by generating a plurality of fingerprint data sets responsive to placing a finger of a user on the fingerprint sensing area a plurality of times with the finger being slightly repositioned on successive placements. The enrollment circuit also preferably processes the plurality of fingerprint data sets to generate a composite fingerprint data set over an area of the fingerprint larger than the fingerprint sensing area.

The processor preferably further comprises a match determining circuit for determining a match between a new fingerprint and an enrolled fingerprint based upon at least one sensing of the new fingerprint and the composite fingerprint data sets. The match determining circuit may include a comparor to compare a predetermined number of sensings of the new fingerprint with the composite fingerprint data set to achieve a desired performance, such as a at least one of a false reject rate and a desired false acceptance rate.

The enrollment circuit preferably generates a plurality of fingerprint feature location data sets. The feature location data sets may be minutiae location data sets, skin pore location data sets, and/or feature location data sets relating to fingerprint ridge flows.

The enrollment circuit preferably determines a core location for each data set, and accounts for distortion of the finger surface in the plurality of data sets. The circuit may account for distortion by calculating centroids of fingerprint feature locations relative to a reference frame or location, such as the fingerprint core.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
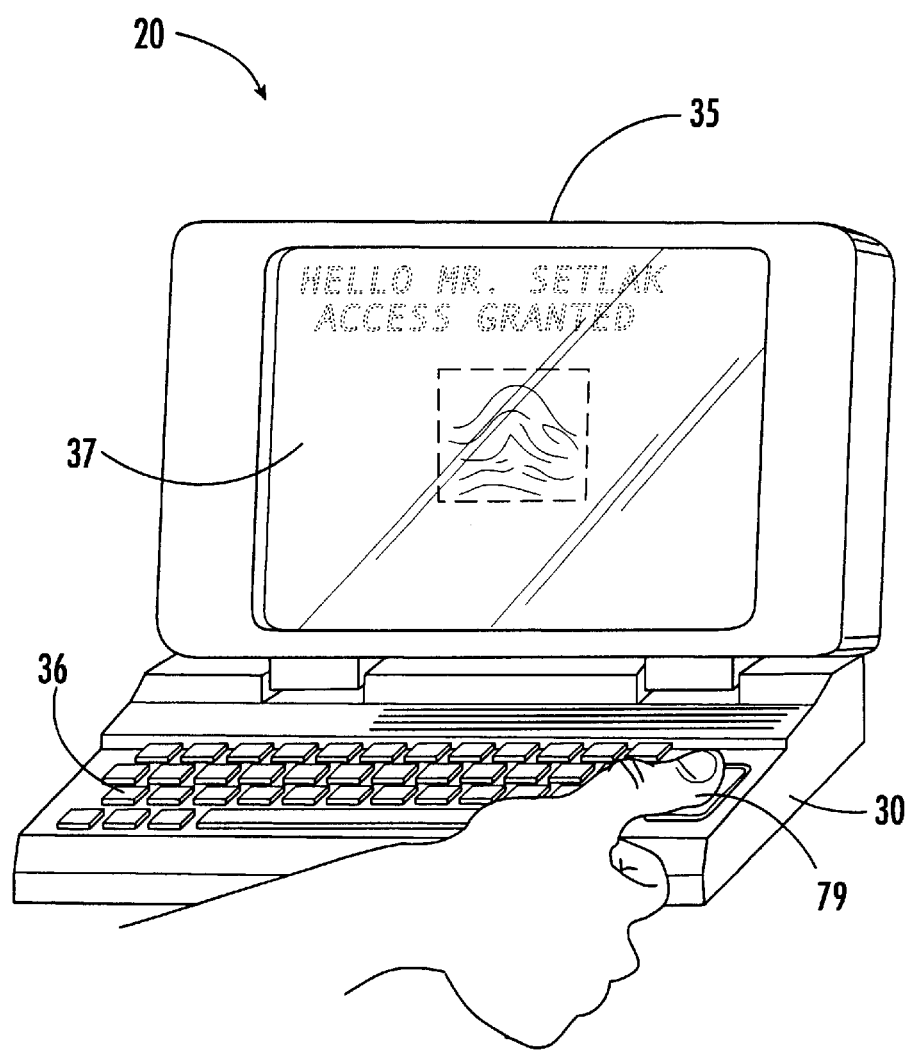
FIG. 1 is a perspective view of a laptop computer including a fingerprint sensor and associated processing software to define an embodiment of the fingerprint sensing apparatus in accordance with the present invention.
Figure 2:
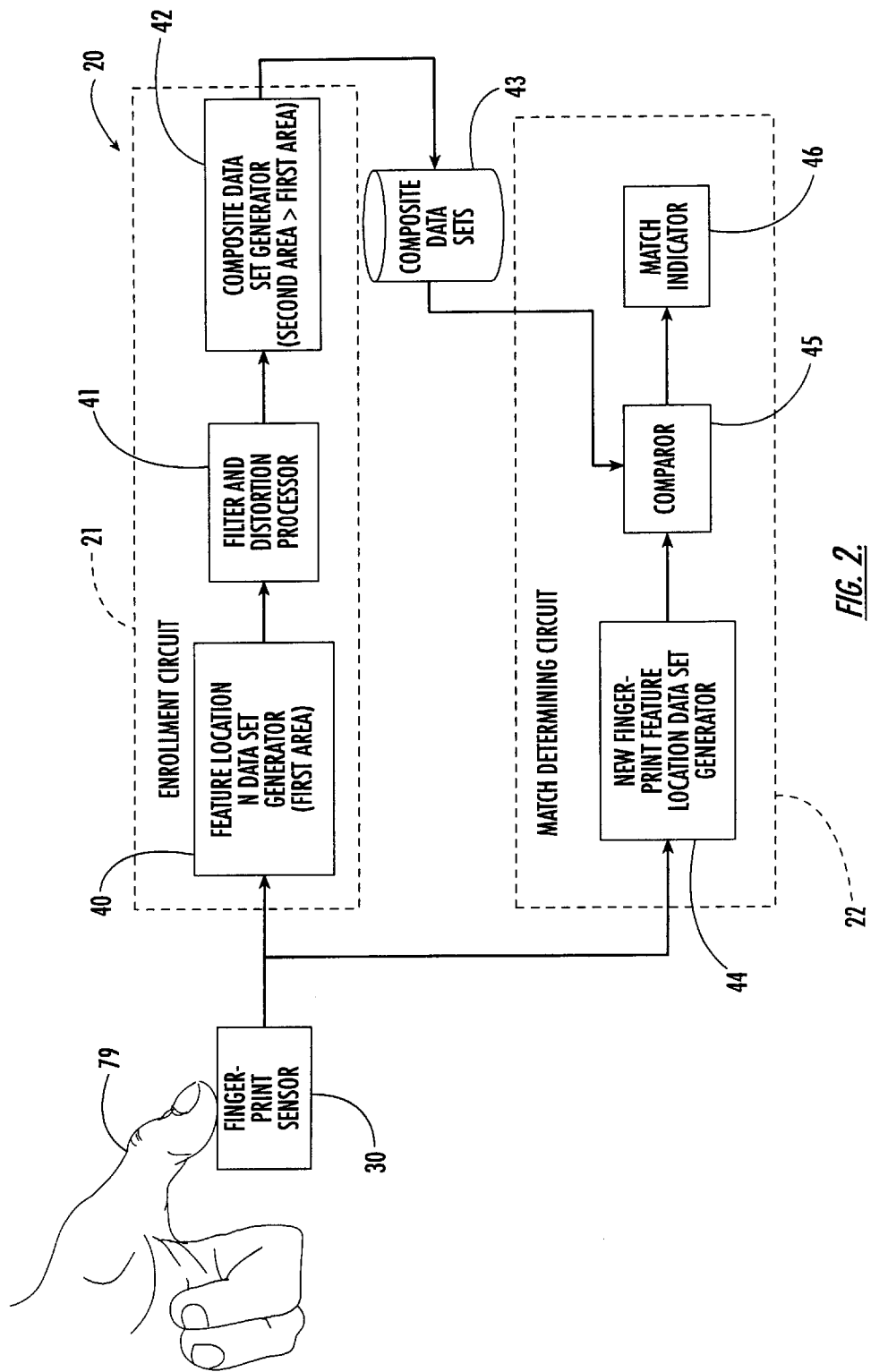
FIG. 2 is a schematic block diagram of the fingerprint sensing apparatus in accordance with the present invention.

Referring initially to FIGS. 1 and 2, the general components and features of the fingerprint sensing apparatus 20 of the present invention are now described. As shown in FIG. 1, the apparatus 20 in one embodiment includes a fingerprint sensor 30 mounted on the keyboard surface 36 of a laptop computer 35. The laptop computer 35 also illustratively includes a foldable display 37. Processing of fingerprint image data may be shared between processing circuitry on the fingerprint sensor 30 and the microprocessor of the computer as would be readily understood by those skilled in the art.

The invention may permit a properly authorized person to become enrolled into a security or access control procedure for the computer 35. One or more persons may be enrolled as will be described below. To use the computer 35 or to have access to certain files, the user's finger 79 is placed onto the fingerprint sensor 30 and a match is determined with respect to the enrolled authorized persons. If a match is not determined, then access to operate the computer 35 or access to certain files is denied as will be readily appreciated by those skilled in the art. Of course, if a match is determined, the person may be greeted by a visual or audible announcement, and access is granted.

The fingerprint sensor 30 may preferably be of a type that uses electric field sensing of the ridges and valleys of a live fingerprint. Moreover the fingerprint sensor is desirably relatively compact, especially for the application in combination with a aptop computer 35. For example, the fingerprint sensor 30 may an integrated circuit electric field sensor as offered by AuthenTec, the assignee of the present invention. Various features and attributes of suitable fingerprint sensors are described in U.S. Pat. Nos. 5,828,773; 5,862,248; and 5,940,526 and U.S. patent application attorney work docket no. 51508, filed concurrently herewith, entitled "Fingerprint Sensor With Leadframe Bent Pin Conductive Path and Associated Methods", all assigned to the assignee of the present invention. The subject matter of each of these patents and patent application is incorporated herein by reference in its entirety.

Those of skill in the art will recognize that the apparatus 20 in accordance with the present invention can be implemented in a number of forms in addition to incorporation into the illustrated laptop computer 35 of FIG. 1. For example, the processing circuitry may be incorporated into the integrated circuit of the fingerprint sensor 30, or may be included in associated circuitry within an overall fingerprints sensor package.

Referring more particularly to FIG. 2, the illustrated apparatus 20 includes an enrollment circuit 21 and a match determining circuit 22. In some embodiments, either of these circuits may operate without the other; however, the composite data sets database 43 is shared between the two circuits. The circuits 20,22 can be implemented in a microprocessor operating under stored program control as will be readily appreciated by those skilled in the art.

Fingerprint image information from the fingerprint sensor 30 is first processed in the feature location data set generator 40 which generates the data sets for a predetermined number of finger placements, with each placement being slightly offset from the prior placement. As will be readily understood by those skilled in the art, the variation in placement may occur naturally, or may be guided, for example, by indicators on the computer 35. Such finger positioning guidance indication is further described in U.S. Pat. No. 5,828,773 and needs no further discussion herein.

The feature location data sets may be based upon fingerprint minutiae, fingerprint pores, or fingerprint ridge flows. Fingerprint minutiae and pore location are highly developed as will be appreciated by those skilled in the art. Fingerprint ridge flow analysis and related indexes are described in U.S. Pat. No. 5,845,005, for example. Other data sets are also contemplated by the invention as will be appreciated by those skilled in the art.

The number of data sets to enroll a finger may vary depending upon the particular application. For many applications, the number of finger placements and corresponding number of data sets may be about 2 to 5. The number is preferably convenient for the user, but which provides the advantages of the present invention. The data set for each finger placement is generated over a first area, typically defined by the fingerprint sensing area.

Downstream from the feature location data sets generator 40 is a filter and skin distortion processing block 41. The filter and skin distortion processing block 41 may remove undesired weak features or artifact features from processing. In addition, the processing block 41 may determine the location of the fingerprint features relative to a predetermined frame of reference, such as based upon the fingerprint core. Determination of the fingerprint core will be readily understood by those skilled in the art without requiring further discussion herein.

A centroid, for example, may be calculated for each similar feature in different data sets. Of course, skin distortion will cause those features further, from the core to appear to have a greater spacing. Thus the determination of what is the same feature on different placements is determined based upon the distance from the core, for example. Those skilled in the art will recognize other similar processing that can be performed to ensure that successive data sets can be correlated one to the other(s).

In particular, downstream from the filter and distortion processing block 41, is located the composite data set generator 42. As will be appreciated by those skilled in the art, because multiple finger placements at slightly different positions are processed, the composite data set can correspond to a larger area than the first area for each finger sensing. This first area typically being limited by the size of the sensing area of the fingerprint sensor 30. In other words, the second area of the composite data set is larger than any of the individual fingerprint sensings of the finger during enrollment. Accordingly, two significant advantages are available. First, the size of the sensing area of the fingerprint sensor 30 can be reduced. For an integrated circuit embodiment of the fingerprint sensor 30, substantial savings can be realized by reducing the needed sensing area.

Second, the positioning of the finger to be matched may be relaxed. In other words, since the new fingerprint feature set is compared to a larger composite data set, positioning of the finger is not as critical. Both of these noted advantages of the invention can be realized, or trade-offs can be made. In addition, reductions can also be realized in the calculations required.

Referring now more particularly to the lower portion of FIG. 2, the match determining circuit 22 is further described. This circuit 22 is shown connected to the same fingerprint sensor 30, as will typically be the case. However, in other embodiments, a different fingerprint sensor, and perhaps having a different sensing area, may also be used.

The fingerprint sensor 30 is connected to the new fingerprint feature location data set generator block 41. For example, this block 41 may generate a set of minutiae locations, pore locations, or ridge flow related location data, as described above for the enrollment. The data set from the new fingerprint feature location data set generator 41 is input to the comparor 45 which, in turn, is also connected to the composite data sets database 43. The comparor 45 compares the new fingerprint feature location data set with those already stored to determine if a match exists. The various processing algorithms for determining a match will be readily appreciated by those skilled in the art without requiring further discussion herein.

If a correct match between the new fingerprint and one stored in the database 43 is determined, such may be indicated by the schematically illustrated match indicator 46. For example, the match indicator 46 may be a message on the display screen 37 of the laptop computer 35. Alternately or in addition thereto, a match indication may be indicated simply by granting the user access or permission to continue.

Figure 3:
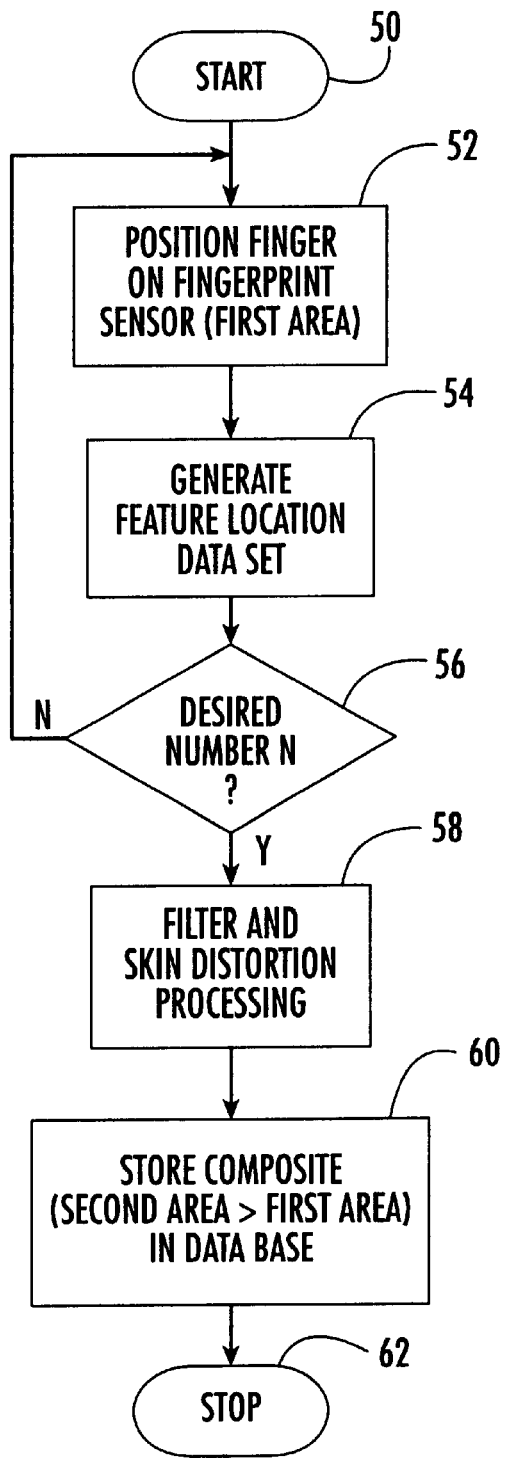
FIG. 3 is a flow chart of a method for generating composite data sets in accordance with the present invention.

Turning now to the flow chart of FIG. 3, the method steps for enrolling a fingerprint of a user are now described in greater detail. From the start (Block 50) the user positions or places his finger on the fingerprint sensor 30 at Block 52. The fingerprint sensor has a first area. A feature location data set is generated at Block 54. At Block 56 the number of times the finger has been positioned is determined and if the number is not sufficient, that is, less than the desired number N, then the process returns to Block 52.

If N data sets have been generated as determined at Block 56 then the method proceeds to the filter and accounting for skin distortion at Block 58 as described in greater detail above. The N data sets are preferably collected over a predetermined period of time to ensure that only the desired user is enrolling. In other words, a learning or enrolling window is opened for only a predetermined time to thereby increase security as will be appreciated by those skilled in the art.

At Block 60 a composite data set is stored in a database 43, and the process stops (Block 62). Of course, the process may be repeated for a number of users to be enrolled into the database 43 as will be readily appreciated by those skilled in the art.

Figure 4:
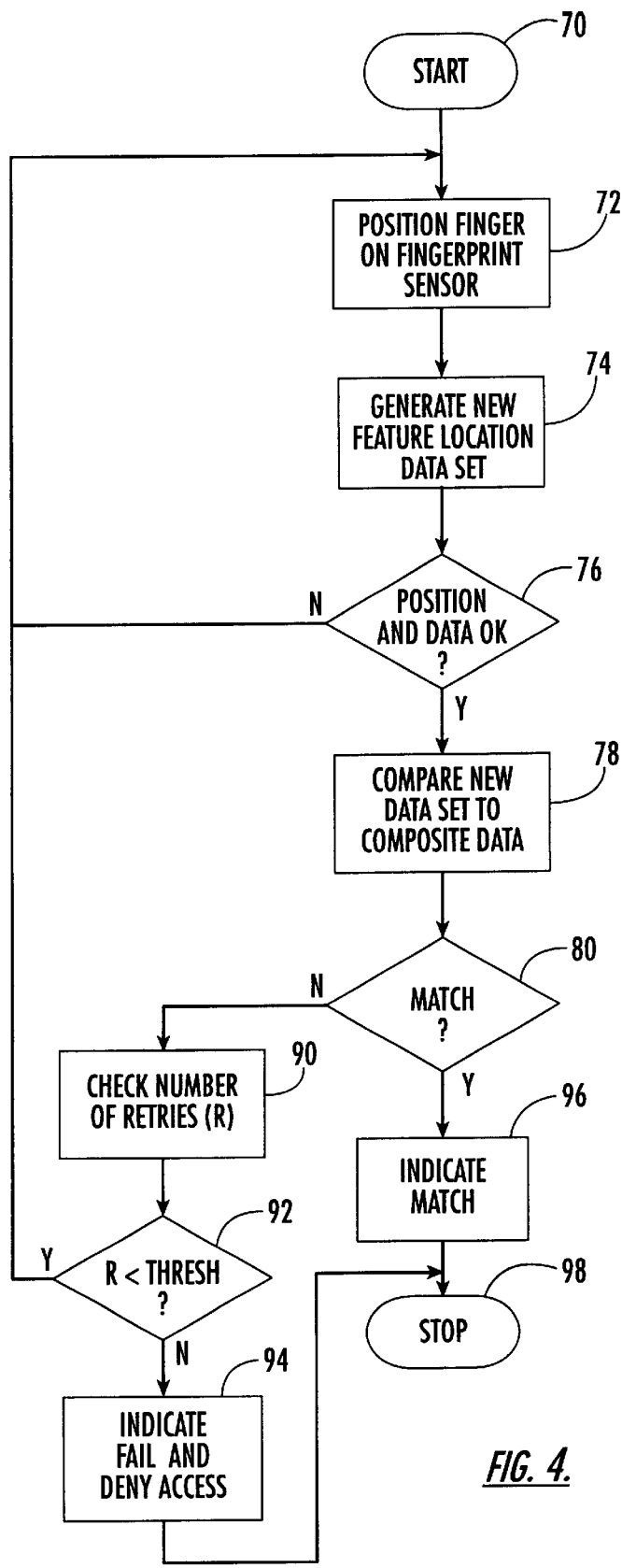
FIG. 4 is a flow chart of a method for comparing a new fingerprint to composite data sets to determine a match in accordance with the present invention.
Figure 5:
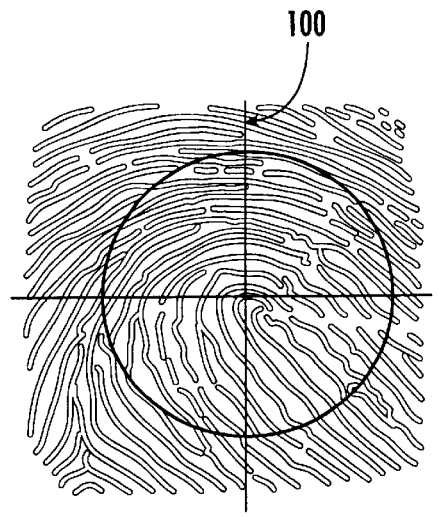
FIGS. 5 through 8 are fingerprint images for a plurality of finger placements in accordance with the present invention.

Turning now additionally to the flow chart of FIG. 4, the method of matching a new fingerprint is described in greater detail. From the start (Block 70), the finger is positioned on the fingerprint sensor 30 at Block 72. A new feature location data set is generated at Block 74. If the finger has been properly positioned and the data is acceptable as determined at Block 76, the new data set is compared to the composite data sets in the database 43. If the position or data at Block 76 is not acceptable then the user may reposition his finger 79 and repeat the process. If a match is determined at Block 80, a match is indicated at Block 98 before the process terminates (Block 98).

In addition, as would be readily understood by those skilled in the art, the matching may include comparing a predetermined number of sensings of the new fingerprint with the composite fingerprint data sets.

The number of matchings may be determined to achieve a desired performance, such as a desired false reject rate, and/or a desired false acceptance rate.

If after comparing the new data set to the data sets in the composite database 43, a number of retries R is checked at Block 90, and if the number of retries R is less than a predetermined threshold (Block 92) the process is repeated. If the number of retries at Block 92 is greater than the threshold a failure is indicated and access may be denied at Block 94.

Figure 6:
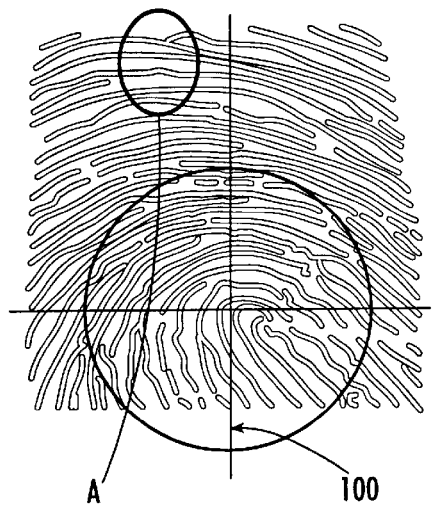
Figure 7:
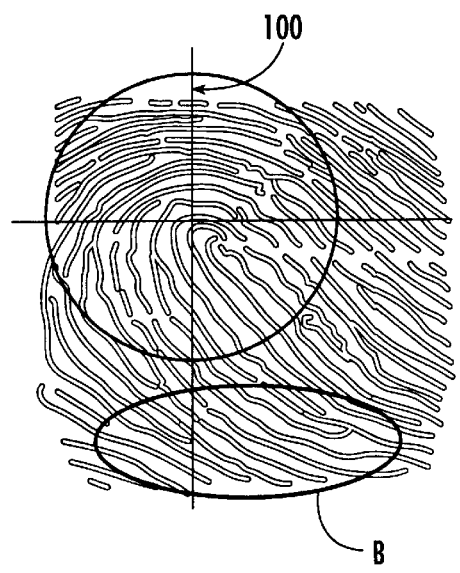
Figure 8:
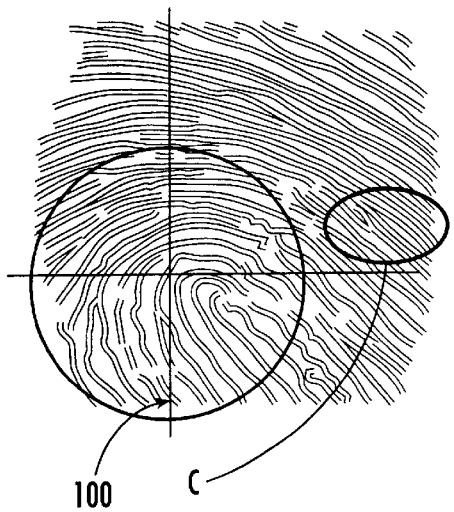

Turning now to FIGS. 5–8, a series of fingerprint images for a finger being enrolled are shown. A frame of reference 100 is shown in each of the figures. The frame of reference is based upon the core of the fingerprint, although rotation of the different images is not illustrated but can be readily calculated based upon the location of the fingerprint minutiae. Various minutiae are located in the images as would be readily understood by those skilled in the art. FIGS. 6–8 also include respective labeled areas A, B and C enclosing respective groups of minutiae points.

Figure 9:
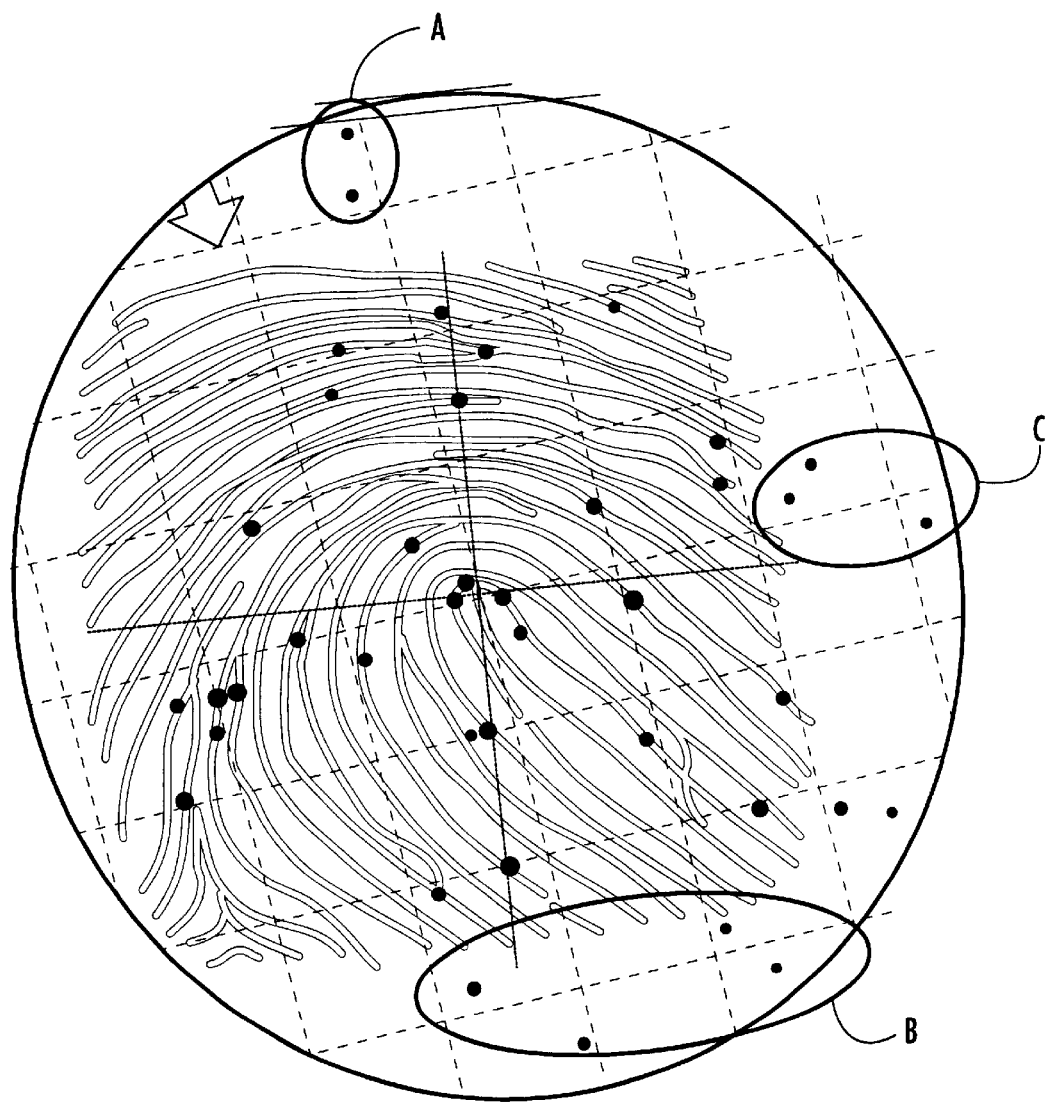
FIG. 9 is a composite/matching image determined from the minutiae of the fingerpint images of FIGS. 5–8 overlaid on a new fingerprint image and feature location data set in accordance with the present invention.

The labeled areas A, B and C include minutiae points which are illustrated in the composite/matching image of FIG. 9. The composite/matching image shows the location of the minutiae points based upon the successive finger placements (FIGS. 5–8). In addition, the new fingerprint image is superimposed on the minutiae in the figure as will be appreciated by those skilled in the art. As will also be understood by those skilled in the art, other fingerprint features can also be similarly processed and analyzed.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that modifications and embodiments are intended to be included within the scope of the appended claims.

That which is claimed is:

1. A method for generating fingerprint data for a fingerprint area larger than a sensing area of a fingerprint sensor, the method comprising;
    generating a plurality of fingerprint data sets, including a plurality of fingerprint feature location data sets, responsive to placing a finger of a user on the sensing area of the fingerprint sensor a plurality of times with the finger being slightly repositioned on successive placements; and
    processing the plurality of fingerprint data sets including the plurality of fingerprint feature location data sets to generate a composite fingerprint data set over a size of the fingerprint larger than the sensing area of the fingerprint sensor, including accounting for distortion of the finger surface in the plurality of fingerprint data sets by calculating centroids of fingerprint feature locations relative to a reference location.

2. A method according to claim 1 wherein generating a plurality of fingerprint feature location data sets comprises generating a plurality of minutiae location data sets.

3. A method according to claim 1 wherein generating a plurality of fingerprint feature location data sets comprises generating a plurality of skin pore location data sets.

4. A method according to claim 1 wherein generating a plurality of fingerprint feature location data sets comprises generating a plurality of feature location data sets relating to fingerprint ridge flows.

5. A method according to claim 1 wherein generating a plurality of fingerprint feature location data sets comprises determining the feature locations with respect to a reference frame.

6. A method according to claim 5, wherein the reference frame is based upon a fingerprint core location.

7. A method according to claim 1 wherein the reference location comprises a fingerprint core location.

8. A method according to claim 1 wherein generating the plurality of fingerprint data sets comprises generating a predetermined number of fingerprint data sets based upon a predetermined number of finger placements within a predetermined time.

9. A method according to claim 8 wherein the predetermined number of finger placement comprises a number in a range of about 2 to 5.

10. A method according to claim 1 wherein the fingerprint sensor comprises a fingerprint sensing integrated circuit.

11. A method for generating fingerprint data for a fingerprint area larger than a sensing area of a fingerprint sensor, the method comprising:
    generating a plurality of fingerprint data sets responsive to placing a finger of a user on the sensing area of the fingerprint sensor a plurality of times with the finger being slightly repositioned on successive placements; and
    processing the plurality of fingerprint data sets, including accounting for distortion of the finger surface in the plurality of fingerprint data sets, to generate a composite fingerprint data set over a size of the fingerprint larger than the sensing area of the fingerprint sensor, including accounting for distortion of the finger surface in the plurality of fingerprint data sets by calculating centroids of fingerprint feature locations relative to a reference location.

12. A method according to claim 11 wherein the reference location comprises a fingerprint core location.

* * * * *

UNITED STATES PATENT AND TRADEMARK OFFICE
CERTIFICATE OF CORRECTION

PATENT NO. : 6,795,569 B1
DATED : September 21, 2004
INVENTOR(S) : Dale R. Setlak It is certified that error appears in the above-identified patent and that said Letters Patent is hereby corrected as shown below:

Column 3,
Line 30, delete "as a at" insert -- as at --
Line 60, delete "fingerpint" insert -- fingerprint --

Column 4,
Line 37, delete "atop" insert -- laptop --
Line 38, delete "may an" insert -- may be an --

Column 5,
Line 36, delete "further, from" insert -- further from --

Signed and Sealed this

Third Day of May, 2005

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 6,795,569 B1 | Page 1 of 1 |
| APPLICATION NO. | : 09/567645 | |
| DATED | : September 21, 2004 | |
| INVENTOR(S) | : Setlak et al. | |

It is certified that error appears in the above-identified patent and that said Letters Patent is hereby corrected as shown below:

Title page, Item (12) Delete "Setlak" and insert --Setlak et al.--

Title page, Item (75) Inventors: Add "Richard J. Jones", as co-inventor.

Signed and Sealed this
First Day of May, 2012

David J. Kappos
*Director of the United States Patent and Trademark Office*